United States Patent [19]
Kozah et al.

[11] Patent Number: 5,440,492
[45] Date of Patent: Aug. 8, 1995

[54] KINEMATICALLY POSITIONED DATA ACQUISITION APPARATUS AND METHOD

[76] Inventors: Ghassan F. Kozah; Charles M. Donoghue, both of 3530 Bee Caves Rd., #210, Austin, Tex. 78746

[21] Appl. No.: 996,078

[22] Filed: Dec. 23, 1992

[51] Int. Cl.⁶ .............................................. G01B 7/00
[52] U.S. Cl. .................... 364/454; 364/559
[58] Field of Search ............... 364/453, 454, 505, 559, 364/560, 561, 474.36, 474.37, 451, 460; 33/1 CC, 503, 504; 73/382 R, 382 G

[56] References Cited

U.S. PATENT DOCUMENTS

| | | | |
|---|---|---|---|
| 4,205,385 | 5/1980 | Erickson et al. | 364/560 |
| 4,222,272 | 9/1980 | Mairson | 73/517 R |
| 4,295,201 | 10/1981 | Wiklund | 364/560 |
| 4,949,089 | 8/1990 | Ruszkowski, Jr. | 342/52 |
| 5,051,934 | 9/1991 | Wiklund | 364/561 |
| 5,245,537 | 9/1993 | Barber | 464/410 |
| 5,287,628 | 2/1994 | Yamaguchi et al. | 33/361 |

*Primary Examiner*—Michael Zanelli
*Attorney, Agent, or Firm*—Shaffer & Culbertson

[57] ABSTRACT

An apparatus and method for measuring the location of points in a defined reference frame. The apparatus includes a plurality of linear and angular accelerometers that facilitate kinematic navigation as the device moves about in space. Thus, measurements may be taken from any orientation and location. In a first embodiment of the apparatus, a distance measuring device measures the distance to the point along a measuring axis and then calculates the location of the point in the defined reference frame based upon the distance to the point and the location and orientation of the device. In a second embodiment of the apparatus, a user touches the measured point with a touching member that aligns with the measuring axis. A computing device then calculates the location of the point based upon the location of the touching member and the location and orientation of the device. Data transfer port facilitates the transfer of data acquired by the device to other systems for immediate further use or display. Also included with the invention are features for aligning the axes of the defined reference frame with the earth's local gravitational and north directions. The establishment of these references along with further associated steps facilitates the correction of positional errors.

9 Claims, 3 Drawing Sheets

KINEMATICALLY POSITIONED DATA ACQUISITION APPARATUS AND METHOD

RELATED APPLICATION

This application is co-pending with a sister application Ser. No. 07/974,924 entitled COMPUTERIZED THREE DIMENSIONAL DATA ACQUISITION APPARATUS AND METHOD filed on Nov. 11, 1992 and issued on Aug. 9, 1994 as U.S. Pat. No. 5,337,149.

BACKGROUND OF THE INVENTION

This invention relates to an apparatus and method that measures the coordinates of points in three dimensional space. More particularly, the apparatus and method of this invention relates to a kinematically and/or semi-kinematically positioned measuring device that tracks its own location and orientation, allows a user to measure the coordinates of points from any desired location, and acts as a direct link and input device to a computer for processing and viewing data as it is acquired.

Data on the spatial characteristics of both man made and natural objects is valuable and useful for many purposes. Surveyors use data on the physical location of the features of the earth when they create maps and plans. The maps and plans are then used by developers, landowners, government employees, and numerous other persons that require accurate and concise visual descriptions of the spaces and objects. Architects and engineers use models and drawings in the construction and renovation of structures and spaces. Real estate sales persons use drawings of land and buildings as sales and leasing tools. Facility and asset managers use models to track and manage large facilities and their contents.

These and other create a need for accurate and inexpensive input data. In the case of existing buildings, drawings are often used as sources of input data. In the case of spatial scenes such as accident or crime sites or in the case of buildings without existing drawings and similar instances where spatial information is of value, input data must be obtained through physical measurements and then converted to drawings or other means of display. Heretofore, the most accurate way to acquire the desired data has been the use of formal surveying tools and techniques to measure the spatial characteristics of the land or buildings. These techniques, although generally accurate, have proven to be inappropriate in many situations because of the high cost of performing the work involved in taking the measurements and the difficultly in converting the raw data to a useable form.

Currently used surveying techniques have been in use for many, many years and have changed little in concept over time. Surveyors still use transits, theodolites, and other similar devices to record the horizontal and vertical angles from a stationary traverse point to a measured point. The distance from the traverse point to the measured point must also be measured in order to calculate the relative locations of the traverse point and the measured point. Traditionally, distances are measured manually with a tape measure or the like. More recently, electronic distance measuring devices (EDM) have been used to more accurately and easily measure the distances between points.

U.S. Pat. No. 4,295,201 to Wiklund disclosed a device for mapping an area. The device, in its preferred embodiment, was mounted on a tripod and comprised an electronic distance meter, a vertical angle unit, a horizontal angle unit that included a detector that detected the earth's magnetic field, and a calculating unit. The device used the earth's magnetic field to compute the distance from a fixed point to a measuring point on an object and the direction from the fixed point to the measuring point in the horizontal plane relative to a reference direction.

U.S. Pat. No. 4,205,385 to Ericson, et al. disclosed a surveying system comprising a theodolite, a level sensor, and an on board microcomputer that can be used in conjunction with an electronic distance measuring instrument. The device translated raw data, comprising horizontal angle, vertical angle, and slope range, into the more useful components of horizontal distance, latitude, departure, and elevation.

U.S. Pat. No. 5,091,869 to Ingram et al., disclosed a method for creating a two dimensional floor plan of an existing building. The Ingram et al. device used an electronic distance measuring device, a theodolite, and a data collector to measure the angles and distances to prominent points on walls from a traverse point. The data collector stored the data for a subsequent transfer to a separate and remote computer. In a separate operation, the computer used the data to create a two dimensional floor plan.

All of these devices suffered the same shortcomings. The measurements were taken from a stationary traverse location that was fixed relative to the area or object being measured. Although multiple traverse locations could be established and measurements could be taken from those traverse locations, the measuring devices had to be precisely positioned at each traverse point so that points measured from that traverse location could be referenced to a global reference frame. The requirement of a stationary traverse location made the process of measuring the physical location of points tedious, time consuming, and expensive. Additionally, the user could not view his or her work as it progressed for verification and correction since these devices do not operate as real-time input devices for computers and applications software. Further, these devices did not locate the measured points in three dimensions, they only produced angle and distance measurements. Thus, additional external calculations were required to calculate the location of measured points in three dimensions.

SUMMARY OF THE INVENTION

Accordingly, it is an object of the present invention to overcome the aforementioned limitations and problems in collecting data. In order to overcome these problems, the present invention discloses an untethered, real-time device that continuously tracks its own location and orientation in three dimensions, measures the location of points on the object or space, calculates the location of the measured points, and transmits the data to a computer to create a model of the object or space and to display it to the user in real-time.

Such a device embodying the principles of the present invention preferably comprises a measuring means for locating a point along a measuring axis, an inertial measurement means, a computing means, and a data transfer means.

The inertial measurement means (IMM) preferably comprises at least three linear accelerometers, or like sensors, and at least two angular accelerometers, or like sensors. These components facilitate inertial navigation as the device moves about in space.

The computing means preferably comprises one or more microcontrollers, controlling buttons and a keypad, a computer with a display screen, preferably a notebook or penbased computer or the like, and associated software such as computer aided drafting (CAD) software. The computing means has sufficient capacity to run the associated software, calculate the position and orientation of the device in free space in real-time, calculate the location of measured points, transfer the data to the associated software for processing, and interact with the user and software.

A first preferred embodiment of the apparatus of the present invention is called the "free floater" device, includes the previously described elements, and, as an embodiment of the measuring means, includes an electronic distance measuring unit (EDM) that measures the distance to a point on an object from the measuring device along a measuring axis. The device then uses the distance measurement, along with data on the real-time location and orientation of the device, to calculate the location of the measured point.

A second preferred embodiment of the apparatus of the present invention is called the "semi-free floater" device and includes the previously described elements and, as an embodiment of the measuring means, a touching means for touching a point whose location is to be measured. Such touching means is of a known length and lies along the measuring axis. When a point is measured, the device calculates the location of the point based upon real-time data on the device's location and orientation and the location of the touching means relative to the device.

The apparatus of the present invention may also include one or more gravity vector detection means for detecting the direction of the earth's gravitational field, a north direction detection means for detecting the direction of north, and an error correcting means for correcting positional errors. The detection means facilitate the establishment of a local reference frame in which one axis is parallel to the local gravity vector, a second axis is horizontal and aligned with the north direction, and the third axis is horizontal and aligned with either the east or west directions, in order to form a right-handed system. The error correcting means uses the directional, as well as other data, to correct positional errors.

The present invention further includes first and second preferred methods embodying the principles of the present invention using the "free floater" and the "semi-free floater" devices respectively. In the operation of either embodiment of the method, a measuring device initializes itself at power up and establishes a local reference frame. Once the local reference frame is established, the device continuously tracks its own location and orientation in the local reference frame using techniques known in the art.

In the operation of the "free floater" device, to measure the location of points, a user aligns the measuring axis of the distance measuring device on a point and then triggers the device. The EDM measures the distance to the point from the device along the measuring axis and, at the same time, the computing means records the real-time location and orientation of the device in the local reference frame. Then, the computing means uses the distance data and the device location and orientation data to compute the location of the point in the local reference frame.

With the "semi-free floater" device, the user measures the location of a point by touching the point with the touching means. At that time, the computing means computes and records the real-time location and orientation of the device in the local reference frame. The computing means then calculates the location of the point in the local reference frame based upon the location and orientation of the device and the location of the touching means relative to the device.

The method of the present invention also allows the user to establish a user defined reference frame that may be referenced to some part of the physical structure being measured. The computer then converts the coordinates of measured points from the local to the user defined reference frame.

The present invention provides several important advantages over the prior art. The disclosed device tracks its own location and orientation in real-time in a local reference frame which allows measurements to be taken with the distance measuring device in any location and in any orientation. The device then immediately converts this raw input data into three-dimensional coordinates of measured points. Further, the device facilitates the direct transfer of recorded data to the software to enable a user to quickly and accurately model an object or space, viewing the information as it is acquired. The device facilitates establishing a user defined reference frame, providing significance to the location of the measured points. Most importantly, the device allows the user to move freely through a space without the incumbrance of stationary instruments and their setups, viewing the information in near real-time as it is acquired. Thus, the device facilitates quick, easy, and accurate collection and review of data on the location of physical points.

These and other objects, advantages, and features of the invention will be apparent from the following description of the preferred embodiment, considered along with the accompanying drawings.

DESCRIPTION OF THE PREFERRED EMBODIMENTS

Described in this section are two preferred devices embodying the principles of the present invention. A first preferred device embodying the principles of the present invention is called the "free floater" device 10. A second preferred device embodying the principles of the present invention is called the "semi-free floater" device 10'.

Figure 1:
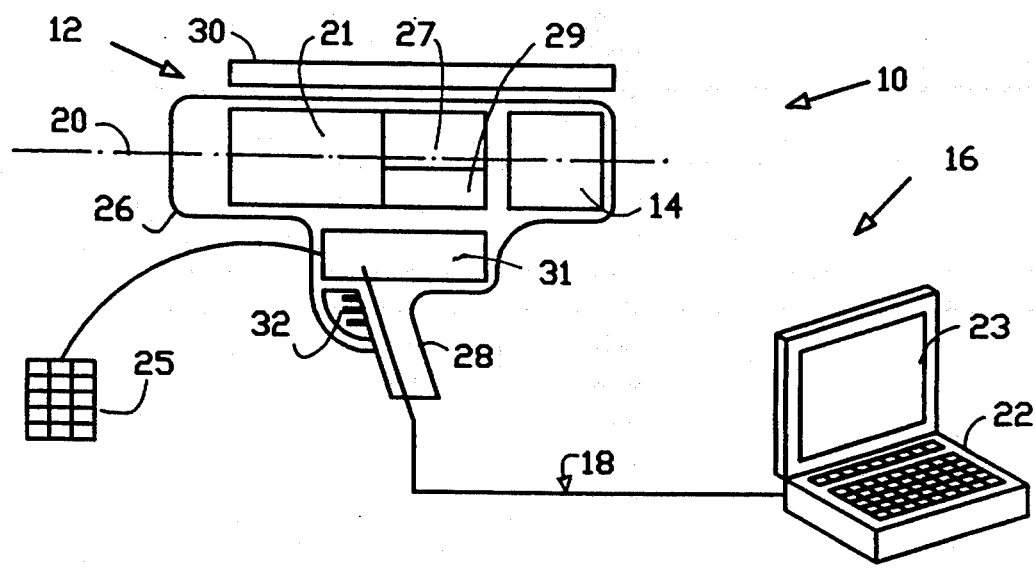
FIG. 1 is a schematical side view of a first preferred apparatus embodying the principles of the present invention called the "free floater" device.

Referring to FIG. 1, a schematical view of the "free floater" device 10, the device comprises a measuring means 12, an inertial measurement means (IMM) 14, a computing means (CM) 16, and a data transfer means 18.

The measuring means 12 facilitates determining the location of a measured point along a measuring axis 20 which has a known position relative to the device 10 itself. Preferably, an electronic distance measuring device (EDM) 21 is employed to measure the distance to a point along the measuring axis 20. This preferred embodiment uses a laser light EDM 21 but other distance measuring devices and techniques could also be employed.

The IMM 14 facilitates inertial navigation and includes a plurality of linear and angular accelerometers or like sensors (not shown). The IMM 14 preferably includes three linear accelerometers or like sensors oriented so that the linear motion along three orthogonal axes may be measured, and at least two angular accelerometers or like sensors, so that angular motion about the same orthogonal axes may be derived. Inertial navigation is well known in the art and one skilled in the art will recognize that many different implementations of the IMM 14 are possible that will achieve the desired results.

The computing means 16 calculates the location and orientation of the device 10 in a local reference frame in real-time based upon data from the inertial measurement means 14. The computing means 16 also calculates the coordinates of measured points using data on the distance to the points and the location and orientation of the device 10. Preferably, the computing means 16 comprises a plurality of microprocessors 31 connected to the device 10 and another, separate, externally connected computer 22 with a display screen 23, such as a laptop or penbased, with associated software (not shown), although other embodiments of the computing means are possible.

The data transfer means 18 is for transferring data between the measuring means 12, the inertial measurement means 14, the computing means 16, and other external devices. While in the preferred embodiment the data transfer means 18 comprises a plurality of electrical cables, radio or other means could be used for the transfer of data. The data transfer means 18 makes data available for viewing immediately after it is acquired and facilitates the connection of the device 10 to other systems, such as computer aided drafting hardware and software packages.

The "free floater" device 10 components preferably are housed in a shell 26 that includes a handle 28, a viewfinder 30 for aligning the measuring axis 20 on a measured point, and buttons 32 on the handle for triggering the device to measure and for enabling other functions. Connected to the shell 26 is a controlling keypad 25 that provides a user further controlling functions. Also preferably housed in the shell 26, but not shown, is associated equipment for powering the components of the device 10. The powering equipment may, however, be housed externally and connected via powering cables. The weight of the shell 26 and the associated components is great enough to prevent abrupt positional changes, thereby facilitating more accurate positioning and measurements, but is still light enough for a single person to carry and use. The device 10 also may be mounted on a tripod or other stationary mounting structure if a user so desires.

Figure 2:
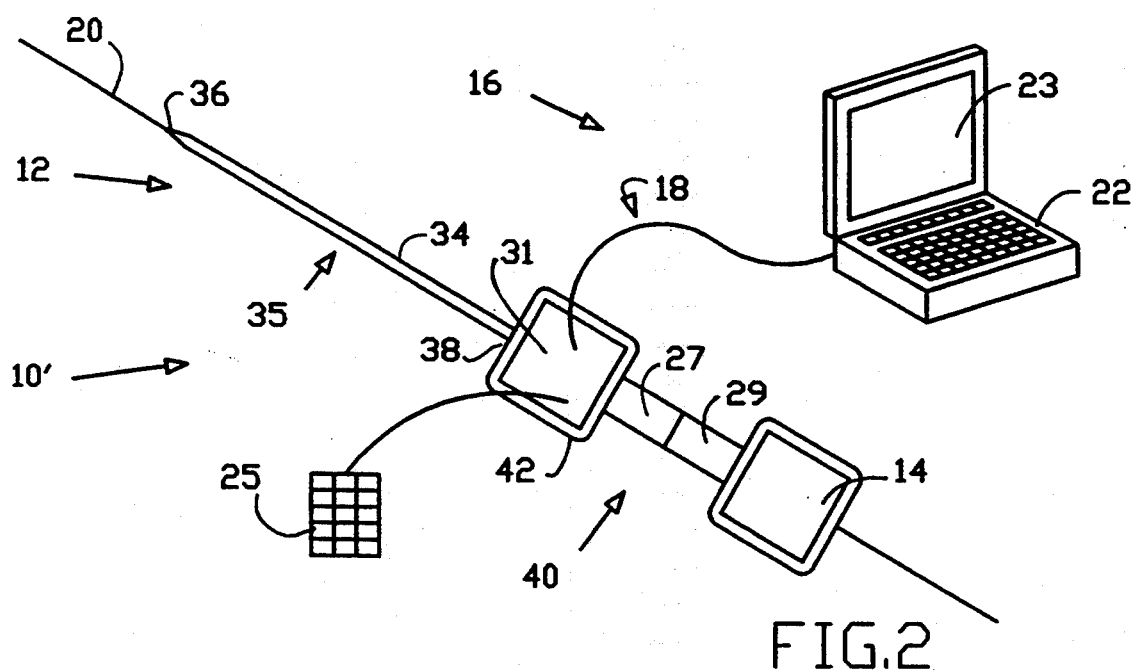
FIG. 2 is a schematical side view of a second preferred apparatus embodying the principles of the present invention called the "semi-free floater" device.

Referring to FIG. 2, a schematical view of the "semi-free floater" device 10′, the device comprises a measuring means 12, an inertial measurement means 14, a computing means 16, and a data transfer means 18. In this embodiment, the IMM 14, the computing means 16, and the data transfer means 18 are identical in function to those of the "free-floater" device 10 described above.

The measuring means 12 of the "semi-free floater" device 10′ comprises a touching means 35 that aligns with the measuring axis for touching the measured point. The touching means 35 is preferably embodied as an elongated member 34 of a known length that lies in a known position relative to the device 10′ along a measuring axis 20. Such elongated member 34 includes a free end 36 used for touching a measured point and a mounting end 38 used for mounting the elongated member to a handle 40. In operation, the computing means 16, using data from the IMM 14, continually calculates the location and orientation of the device 10′ in real-time in a local reference frame. Points are measured by touching them with the free end 36 of the elongated member 34 and triggering control buttons (not shown) or a controlling keypad 25 that connects to the handle 40 and provides further user control options. When performed, the computing means 16, which knows the length and relative location of the elongated member 34, calculates the location of the measured point.

Preferably, the "semi-free floater" device 10′ includes a shell 42 that houses the IMM 14, the computing means 16, the data transfer means 18, and power supply (not shown). The elongated member 34 connects to the shell 42 and lies along the measuring axis 20. Connected externally to the shell 42 is an external computer 22 that is preferably a portable penbased or laptop variety. Also included is powering equipment (not shown) that preferably resides inside the shell 42 but may be housed externally and connected via powering cables.

Kinematic and semi-kinematic positioning using accelerometers or like sensors output is well known in the art and, in the preferred embodiments of the present invention, is performed using the outputs of the accelerometers. Because the accelerometers are fixed to the "free floater" device 10, and also the "semi-free floater" device 10′, their outputs reflect any motion of the device in any direction in space.

In operation, the device 10 establishes a local reference frame that is fixed relative to the earth and in which the device moves about. By using the outputs of the IMM 14, the computing means 16 continuously calculates the location and orientation of the device 10 in the local reference frame using methods well known in the art. In calculating the location of the device 10, errors are likely. Therefore, correction methods and techniques, well known in the art, may be used in order to minimize and control instrument error.

Further, to provide reference directions and to facilitate the correction of location and orientation errors, the apparatus of the present invention may also include one or more gravity vector detection means (GVDM) 27 for detecting the direction of the earth's gravitational field and a north direction detection means (NDDM) 29 for detecting the direction of north. Both the gravity vector detection means and the north direction detection means are well known in the art and preferably embodied in the form of solid-state electronic devices.

Preferably, the local reference frame has one axis horizontal and oriented to the north, a second parallel to the local gravity vector, and a third axis horizontal and oriented to the east, although other reference flames are possible. Because the orientation of the local reference frame is known relative to the earth's gravity and north vectors, corrections may be made at any time for misorientation of the device.

Errors in positioning may be introduced by inaccuracies in the IMM components, inaccuracies in the EDM, inaccuracies in the related computations, and by the earth's rotation. Resultantly, the device 10 may not always correctly calculate its location and orientation in the local reference frame and accurately measure the location of measured points. Therefore, the devices 10 and 10' may include several independent error correcting means for facilitating the correction of such errors that may occur.

Means for correcting the positional errors may be embodied in the form of a cradle (not shown), of known location and orientation, in which the device 10 or 10' is intermittently placed during a correcting procedure. At the beginning of a measuring procedure, a user establishes the location of the cradle by placing the device 10 or 10' in the cradle. The cradle itself may include gravitational and north vector detecting devices that may be connected to the device though the data transfer means 18. The location and orientation of the cradle in the local reference frame is known and, when the cradle engages the device 10 or 10', in manners known in the art during the correcting procedure, error correction is facilitated.

An alternative way to correct for positional errors is to repeatedly measure the location of one or more key points on the object or space being measured intermittently. When each point is first measured, a base location is established for each point. Thereafter, when each point is remeasured, error correction is facilitated.

The method of the present invention may further include statistical "best-fit" error calculation and data filtering methods well known in the art to refine the most likely position of a point, line, or surface in three dimensional space when taking measurements.

Figure 3:
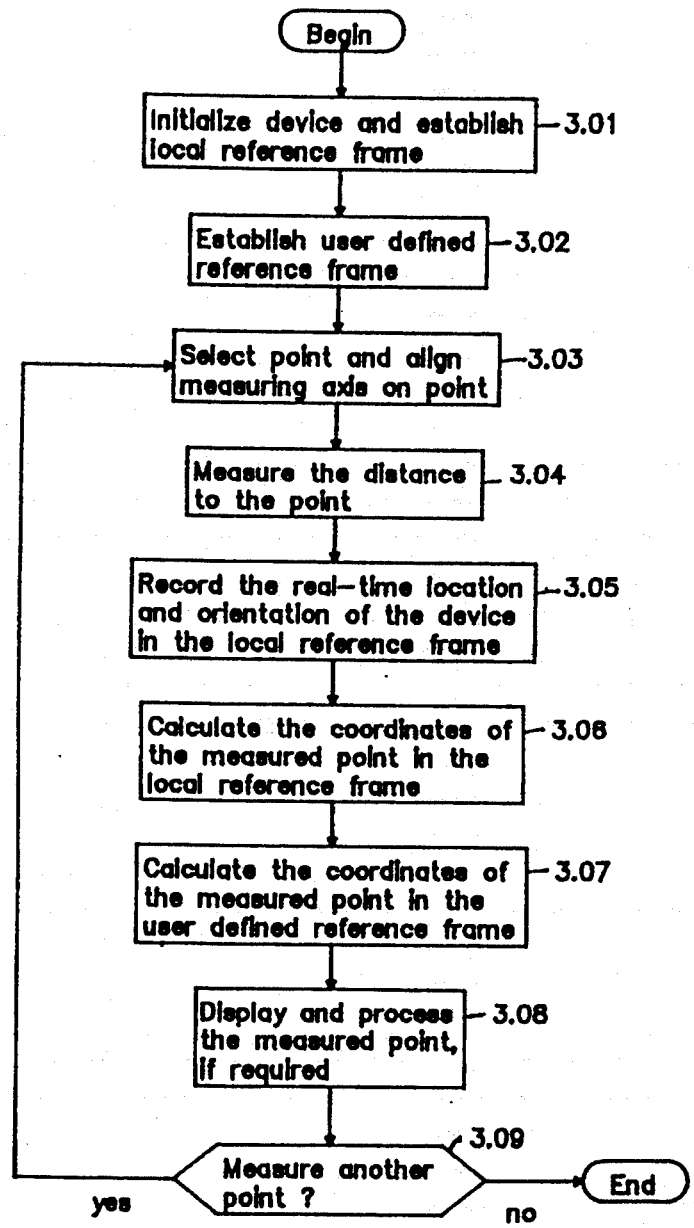
FIG. 3 is a flow chart describing the steps in a preferred method embodying the principles of the present invention that uses the "free floater" device.

A first method embodying the principles of the present invention uses the "free floater" 10 embodiment of the apparatus of the invention and includes steps as described in the flow chart of FIG. 3. The first step in the method is to initialize the device 10 to establish the local reference frame origin and orientation (block 3.01). This step is automatically performed at initialization but may be performed again at any time as a reset or reorientation using the reset cradle(s) or other means. The defined local reference frame is a cartesian coordinate system to which all further locations are referenced. Preferably, the z-axis of the local reference frame aligns with the earth's local gravity vector and the x-axis aligns with the earth's local north vector. After initialization, the computing means 16 continually performs the step of calculating the location and orientation of the measuring device 10 in the local reference frame as was previously described and is well known in the art.

Figure 4:
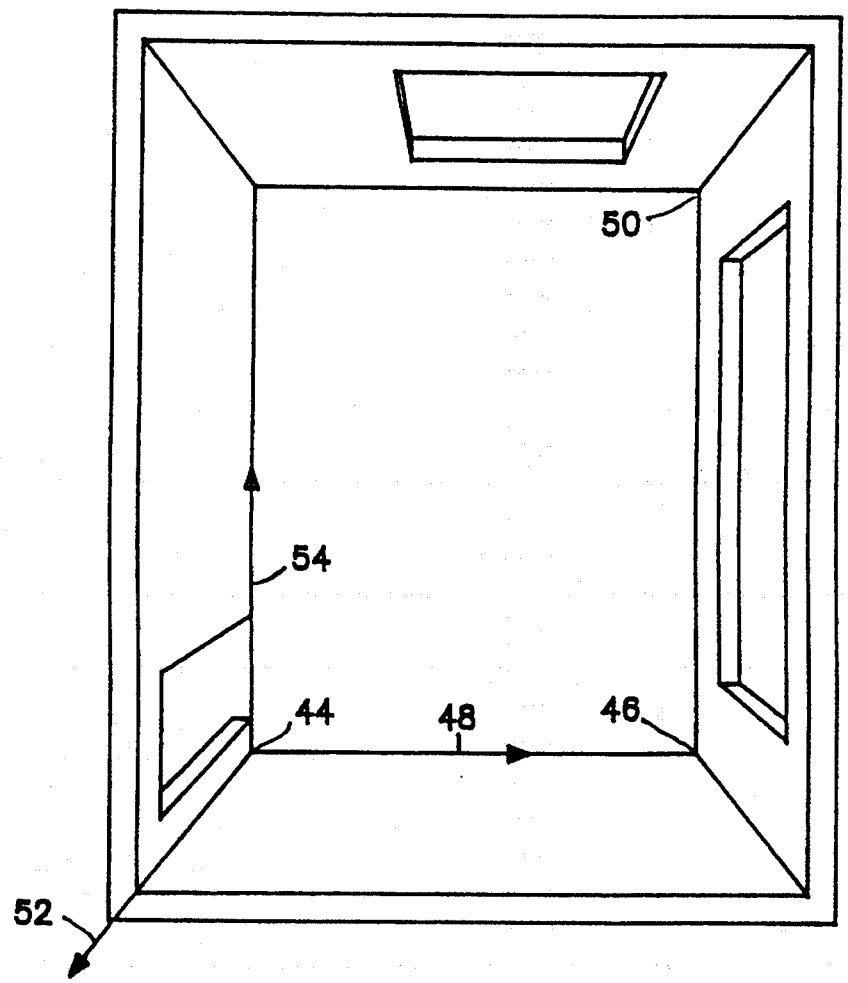
FIG. 4 is a schematical perspective top view of a building space used to describe the steps required to establish a user defined reference frame.

As shown in block 3.02, the next step in the method of the present invention is establishing a user defined reference frame. This step is explained by way of example referring to FIG. 4, a perspective top view of a building space being measured. The user first selects a user defined reference frame origin, represented by point $P_1$ 44, and measures the location of the point with the measuring device 10. The user takes this measurement by aligning the measuring axis 20 of the device 10 on the point $P_1$ 44 and triggering the device. At the same time as the measuring means 12 measures the distance to the point from the measuring device 10 along the measuring axis 20, the computing means 16 records the real-time location and orientation of the device 10 in the local reference frame, and then calculates the location of the point $P_1$ 44 in the local reference frame.

Next, the user selects and measures a second point $P_2$ 46 such that points $P_1$ 44 and $P_2$ 46 do not coincide and such that the vector from $P_1$ 44 to $P_2$ 46 defines the x-axis direction 48. The user next selects and measures a third point $P_3$ 50 such that points $P_1$ 44, $P_2$ 46, and $P_3$ 50 are not collinear and such that the plane formed by the three points $P_1$ 44, $P_2$ 46, and $P_3$ 50 defines the x-y plane (not shown). The vector cross product of the vector formed by points $P_1$ 44 and $P_2$ 46 and the vector formed by points $P_1$ 44 and $P_3$ 50 defines the z-axis direction 52. The vector cross product of the z-axis direction 52 vector and of the x-axis direction 48 vector defines the y-axis direction 54.

Once the user defined reference frame is established, the computing means 16 calculates a transformation matrix that is used to convert the coordinates of a measured point in the local reference frame to coordinates in the user defined reference frame. The matrix elements are derived using the coordinates of points $P_1$ 44, $P_2$ 46, and $P_3$ 50 in the local reference frame. The derivation of the matrix elements is based on three dimensional matrix operations that are well known in the art.

Referring again to FIG. 3, the next step in the method of the present invention is selecting a point to be measured and aligning the measuring axis 20 on the point (block 3.03). Following is the step of measuring the distance to the point from the measuring device 10 with the measuring means 12 (block 3.04). At the same time as the distance to the point is measured, a computing means 16 performs the step of recording the real-time location and orientation of the measuring device 10 (block 3.05).

After the measurements are taken comes the step of calculating the location of the measured point in the local reference frame (block 3.06). The computing means 16 calculates the location of the measured point in the local reference frame based upon the distance to the measured point along the measuring axis 20 and the location and orientation of the measuring device 10 in the local reference frame. This calculation involves trigonometric and algebraic calculations using the acquired data and is well known in the art.

The next step in the method of the present invention is calculating the location of the measured point in the user defined reference frame (block 3.07). The computing means 16 performs this step by multiplying the coordinates of the measured point in the local coordinate system by the previously created transformation matrix. The transformation of the coordinates of a measured point from one coordinate system to another coordinate system is also well known in the art. If required, the next step is transferring the coordinates of the measured point in the user defined reference frame to the associated software for processing and display. (block 3.08)

Next, the user decides whether to measure the location of more points. This decision is represented by block 3.09. An answer of "YES" to this decision results in repeating those steps starting at block 3.03. An answer of "NO" to this decision results in the completion of the first preferred method embodying the principles of the present invention.

An alternate method embodying the principles of the present invention uses the "semi-free floater" device 10'. Referring to FIG. 2, this alternate preferred method is identical to the method used in conjunction with the "free floater" device 10 except that a measurement is taken by touching the point with the free end 36 of the elongated member 34 and depressing a controller button. The elongated member 34 is of known length, aligns with the measuring axis 20, and is in a known position relative to the device 10'. When the user touches a point and signals the computing means 16 to measure the location of the point, the computing means records the real-time location and orientation of the measuring device 10' and, using data on the length of the elongated member 34, calculates the location of the point in the local reference frame. Therefore, the steps of the method of the present invention described in FIG. 3 are modified by the way that the "semi-free floater" device 10' measures and calculates the location of points in the local reference frame.

Although not implied by the flow chart of FIG. 3, the computing means 16 continuously tracks and calculates the real-time location and orientation of both the "free-floater" 10 and "semi-free floater" device 10' after the initialization of step 3.01. Further, steps for correcting positional errors are also included in the method but not represented in FIG. 3. These steps include the use of the cradles, as previously discussed, repeatedly measuring the location of a point that is stationary relative to the space or object being measured, and other means well known in the art such as digital filtering.

While the present invention has been disclosed in connection with the preferred embodiment thereof, it should be understood that there may be other embodiments which fall within the spirit and scope of the invention as defined by the following claims.

We claim:

1. A kinematically or semi-kinematically positioned data acquisition apparatus for measuring the physical location of a point on an object or space in a local reference frame, the apparatus comprising:
   (a) a measuring means for determining the location of the point along a measuring axis;
   (b) an inertial measurement means connected to the measuring means for continually providing data on the relative change in position and orientation of the measuring means;
   (c) computing means for computing the location and orientation of the measuring means in a local reference frame in real-time based upon readings from the inertial measurement means and for calculating the coordinates of the measured point;
   (d) gravity vector detection means for detecting the direction of the earth's gravitational field and providing the direction of the earth's gravitational field to the computing means;
   (e) north direction detection means for detecting the direction of north and providing the direction of north to the computing means;
   (f) error correcting means for correcting positional errors caused by drift in the inertial measurement means by using the earth's gravitational field and the direction of north as reference directions; and
   (g) data transfer means for transferring data between the measuring means, inertial measurement means, the computing means and a data port.

2. The apparatus of claim 1, wherein the measuring means includes:
   (a) a distance measuring device that measures the distance from the measuring device to the measured point along the measuring axis.

3. The apparatus of claim 1, wherein the measuring means further comprises:
   (a) touching means that aligns on the measuring axis for touching the measured point.

4. A method for measuring the location of a point in a local reference frame, the method comprising the steps of:
   (a) establishing a local right-handed cartesian reference frame such that one axis is oriented parallel to a local north vector and one axis is parallel to a local gravity vector;
   (b) aligning a measuring device so that a measuring axis aligns with the point;
   (c) measuring the location of the point along the measuring axis relative to the measuring device;
   (d) calculating the location and orientation of the measuring device in the local reference frame using data from an inertial measurement device that continually relates the relative change in position and orientation of the measuring means;
   (e) calculating the coordinates of the point in the local reference frame using data on the location and orientation of the measuring means in the local reference frame and also the location of the point along the measuring axis with respect to the measuring means; and
   (f) outputting the coordinates of the point in the local reference frame.

5. The method of claim 4 wherein the step of measuring the location of the point along the measuring axis relative to the measuring device includes:
   (a) measuring the distance to the point from the measuring device along the measuring axis.

6. The method of claim 4 wherein the step of measuring the location of the point along the measuring axis relative to the measuring device includes:
   (a) touching the point with a touching means that aligns on the measuring axis.

7. The method of claim 4, further comprising the steps of:
   (a) establishing a user defined reference frame;
   (b) calculating the coordinates of the measured point in the user defined reference frame; and
   (c) outputting the coordinates of the point in the user defined reference frame.

8. The method of claim 4 further comprising the step of:
   (a) correcting positional errors by placing the measuring device in a known location and orientation.

9. The method of claim 7 further comprising the step of:
   (a) correcting positional errors by remeasuring the location of the point.

* * * * *

UNITED STATES PATENT AND TRADEMARK OFFICE
CERTIFICATE OF CORRECTION

PATENT NO. : 5,440,492

DATED : August 8, 1995

INVENTOR(S) : Ghassan F. Kozah and Charles M. Donoghue

It is certified that error appears in the above-identified patent and that said Letters Patent is hereby corrected as shown below:

In Claim 9, Column 10, line 58 of the Patent, change "7" to --4--.

Signed and Sealed this

Thirtieth Day of January, 1996

Attest:

BRUCE LEHMAN

Attesting Officer

Commissioner of Patents and Trademarks